Patented Dec. 18, 1945

2,391,166

UNITED STATES PATENT OFFICE 2,391,166

LEAD SALICYLATE COMPOSITIONS AND PROCESS OF PREPARING SAME

Leonard M. Kebrich, Brooklyn, N. Y., assignor to National Lead Company, New York, N. Y., a corporation of New Jersey No Drawing. Original application October 20, 1942, Serial No. 462,769. Divided and this application August 15, 1944, Serial No. 549,629

7 Claims. (Cl. 106—297)

This invention relates to lead salicylates and mixtures containing the same as well as to a process for making such compounds.

This application is a division of co-pending application Serial Number 462,769, filed October 20, 1942, for improvements in lead salicylates and process for preparing same.

The only lead salt of salicylic acid whose existence is generally accepted in the chemical literature is normal lead salicylate having the formation $Pb(C_6H_4OHCOO)_2$, which may be monohydrated by the addition of 1 mol $H_2O$. This salt, according to the prior art, was commonly prepared by mixing solutions of a soluble lead salt such as lead acetate or lead nitrate and an alkali metal salicylate, whereby the product is obtained as a white crystalline precipitate. The preparation of normal lead salicylate by this method entails a significant loss of the product in washing and handling operations, owing to its appreciable water solubility.

During the course of the preparation of normal lead salicylate by the method of this invention, namely, by gradually adding salicylic acid to a slurry of lead oxide in a limited amount of water, it was observed that one or more basic lead salicylates were formed before the normal salt was finally obtained. By further investigation it was found that altogether three lead salts of salicylic acid may be formed by this procedure, namely, pentabasic lead salicylate, monobasic lead salicylate and normal lead salicylate. These are formed successively upon the introduction of more and more salicylic acid to a given slurry of lead oxide. This new process differs from prior methods of preparation in that the manner of reacting the salicylic acid with a slurry of lead oxide is carried on so as to produce an orderly succession of chemical reactions, controlled by observing the pH of the solution, and results in a precipitated product with good pigmentary properties. Furthermore, the economical advantages of this invention over the prior art method of precipitating from solutions is readily apparent to those skilled in the art, in that the use of large volumes of wash water is avoided and the yield of the product is substantially complete. Thus the products of this invention are obtained with a minimum of handling and no washing, in a state of high purity without further treatment, except the usual flushing or filtering and drying. If a filtrate is obtained, it may be recycled and used again.

According to this invention, a slurry of lead oxide in water is prepared. Agitation is provided and to this suspension is added, at a slow, uniform rate, salicylic acid either dry or as a water slurry. The reaction takes place between the lead oxide and the salicylic acid at room temperature without the presence of a solution forming catalyst such as acetic acid, nitric acid and the like. However, such catalysts may be used in small amounts to initiate the reaction with greater speed, particularly if it is desired to prepare the pentabasic salt $5PbO.Pb(C_6H_4OHCOO)_2$, which, it has been found, is the salt first formed and is an entirely new composition of matter.

When more salicylic acid is added to the suspension of pentabasic lead salicylate, the pH value remains constant until the solid phase contains one mol of salicylic acid per mol of lead oxide at which time the solid phase consists of monobasic lead salicylate, $$PbO.Pb(C_6H_4OHCOO)_2.$$

This also is an entirely new composition of matter.

Further treatment of the monobasic suspension with salicylic acid gives suspensions of substantially constant pH until the solid phase consists of 2 mols of salicylic acid and one mol of lead oxide, or normal lead salicylate, $$Pb(C_6H_4OHCOO)_2.$$

On the addition of salicylic acid to the lead oxide slurry, the pH remains constant at about 9.9 until pentabasic lead salicylate is formed at which time there is an abrupt change in pH from about 9.9 to about 8.3. On the further addition of salicylic acid, the pH remains constant at about 8.3 until all the pentabasic salt is combined with salicylic acid to form the monobasic salt. The completion of the formation of the monobasic salt is accompanied by an abrupt change in pH from about 8.3 to about 4.8. On the further addition of salicylic acid the pH remains constant at 4.8 until all the monobasic salt is combined with salicylic acid to form the normal salt. The completion of the formation of the normal salt is accomplished by a further abrupt drop in pH value below 4.8.

By calculating the amounts of lead oxide and salicylic acid relative to their molecular weights, mixtures of intermediate basicity of the above compounds may be obtained. Preparation of these salts will be illustrated by the following examples.

EXAMPLE I

Pentabasic lead salicylate

A slurry comprising 1340 grams (6 mols) of lead monoxide, 7 liters of water and 3 grams of lead acetate crystals was moderately agitated in a suitable vessel at room temperature. To this suspension was added at a slow, uniform rate over a period of about 2 hours, 276 grams (2 mols) of finely powdered salicylic acid, an amount calculated to be just sufficient to combine with the lead oxide to form pentabasic lead salicylate. As the reaction progressed, the color of the slurry gradually changed from brownish yellow to lighter shades, until when all the salicylic acid had been added, it was a snow-white color. This end point was further characterized by an abrupt change in the pH value from a previously constant value of about 9.9 to about 8.3, at which time all the lead oxide had been converted to pentabasic lead salicylate. This reaction was completed at room temperature. The white product composed of acicular crystals, after filtering and drying, contained 83.8% lead oxide and 16.2% salicylic anhydride and its specific gravity was 5.11, and it had a mean refractive index of 2.05, and an extinction angle of between 28.2° and 31.7°.

EXAMPLE II

Monobasic lead salicylate

A slurry comprising 446 grams (2 mols) of lead monoxide, 2.5 liters of water and one gram of lead acetate crystals was moderately agitated at room temperature in a suitable container. There was then added slowly and uniformly over a 5 hour period, 276 grams (2 mols) of finely powdered salicylic acid. During the progress of the reaction, when 92 grams of acid had been added it was noted that the slurry turned white and this indicated the formation of the pentabasic lead salicylate, with an attendant decrease in pH value of the liquid phase from about 9.9 to about 8.3. The acid addition was continued until the entire calculated amount was added, whereby the pentabasic lead salicylate was converted to the monobasic lead salicylate as indicated by the fact that the pH value which had remained fairly constant at about 8.3, finally dropped at the end to about 4.8. The white product, after filtering and drying, contained 63.4% lead oxide and 36.6% salicylic anhydride and its specific gravity was found to be 3.32. It had a mean refractive index of 1.90, and an extinction angle of between 16.2° and 25.0°.

EXAMPLE III

Normal lead salicylate

A slurry containing 223 grams (1 mol) of lead monoxide, 1.2 liters of water and 0.5 gram of lead acetate crystals was moderately agitated at room temperature in a suitable vessel. 276 grams (2 mols) of finely powdered salicylic acid were then slowly and uniformly added over a 5 hour period to the suspension. The salicylic acid addition was comparatively more rapid in this case and the slurry became white somewhat after the pentabasic stage was indicated by the change in pH. As the reaction progressed, the pH remained constant and then dropped abruptly indicating that the monobasic salt was formed. During the further addition of salicylic acid after the abrupt change in pH to about 4.8, the pH remained constant until the solid phase consisted solely of normal lead salicylate whereupon the pH value fell to below about 4.8.

At this time the pH begins to decrease rapidly and while the operation may be stopped as soon as the lowering is indicated, it usually reaches a value of about 4.4 in practice. At such a time the operator is enabled to make sure that the reaction forming the normal salt is completed. The fine white product after filtering and drying was found to contain 46.4% lead oxide and 53.6% salicylic anhydride and its specific gravity was 2.36. It had a mean index of refraction of 1.78 and an extinction angle of between 21.5° and 43.7°.

The reactions illustrated in the above examples may, if desired, be operated at elevated temperatures up to the boiling point of water and they may be conducted without the aid of the lead acetate used or any other catalyst.

It is possible in the manner of this invention to react pentabasic lead salicylate or the monobasic lead salicylate with other acids such as sulfuric, oxalic, carbonic and the like, which form insoluble lead salts thus to obtain mixtures of lead salicylates and lead sulfate, oxalate, carbonate, or the like. Thus for example a composition containing 4 mols of lead oxalate and one mol of monobasic lead salicylate may be prepared by producing the pentabasic lead salicylate as per Example I and slowly dropping into the slurry a solution of 504 grams of oxalic acid crystals dissolved in 0.6 liters of hot water. In the same manner other mixtures of other insoluble lead salts with lead salicylates may be obtained as will be noted by the following example, in which a mixture of basic lead carbonate and monobasic lead salicylate is prepared.

EXAMPLE IV

A slurry containing 1,000 grams of lead monoxide and 5 liters of water was moderately agitated at room temperature in a suitable container; 206 grams of powdered salicylic acid were then slowly and uniformly added over a period of three hours until the pentabasic lead salicylate was indicated as having been formed. The resultant slurry of the pentabasic salt was then treated with 20 liters of carbon dioxide at room temperature over a period of 2½ hours. The product, after filtering and drying, contained about 58% of basic lead carbonate white lead and 42% of monobasic lead salicylate. The liquid phase was found to contain only a trace of soluble lead.

During the course of the preparation of the products of this invention by the successive addition of salicylic acid to a slurry of lead oxide the most basic compound is formed first and when the PbO content is about 83.8%, the product is pentabasic lead salicylate; when it is about 63.4%, the product is monobasic lead salicylate, the product of the second stage; when it is about 46.4%, the product is normal lead salicylate, the product of the third stage. While it has been shown that it is thus possible to form three different lead salicylates, two of which are new and novel, namely, the pentabasic and the monobasic, the operation may be terminated at any point, or the relative amounts of starting materials may be so selected as to form intermediate mixtures of the above compounds.

The lead salicylates of the present invention are extremely useful as pigments and may be employed either alone or in combination with other pigments in formulating improved coating compositions.

Having thus described my invention, I claim as new and useful the following:

1. A process for preparing a mixture of monobasic lead salicylate and lead oxalate which comprises forming an aqueous suspension of lead oxide and while agitating the same gradually adding thereto powdered salicylic acid until a slurry of pentabasic lead salicylate is formed and slowly adding to said slurry oxalic acid until a mixture of monobasic lead salicylate and lead oxalate is obtained.

2. A process for preparing a mixture of monobasic lead salicylate and basic lead carbonate which comprises forming an aqueous suspension of lead oxide and while agitating the same gradually adding thereto powdered salicylic acid until a slurry of pentabasic lead salicylate is formed and slowly adding to said slurry carbonic acid until a mixture of monobasic lead salicylate and basic lead carbonate is obtained.

3. A process for preparing a mixture of monobasic lead salicylate and lead sulfate which comprises forming an aqueous suspension of lead oxide and while agitating the same gradually adding thereto powdered salicylic acid until a slurry of pentabasic lead salicylate is formed and slowly adding to said slurry sulfuric acid until a mixture of monobasic lead salicylate and lead sulfate is obtained.

4. As a new pigmentary composition of matter, monobasic lead salicylate in intimate and uniform admixture with lead oxalate, prepared according to the method of claim 7.

5. As a new pigmentary composition of matter, monobasic lead salicylate in intimate and uniform admixture with basic lead carbonate, prepared according to the method of claim 7.

6. As a new pigmentary composition of matter, monobasic lead salicylate in intimate and uniform admixture with lead sulfate, prepared according to the method of claim 7.

7. A process for preparing a mixture of monobasic lead salicylate and other insoluble lead salt which comprises forming an aqueous suspension of lead oxide and while agitating the same gradually adding thereto powdered salicylic acid until a slurry of pentabasic lead salicylate is formed and slowly adding to said slurry an acid selected from the group consisting of oxalic, sulfuric and carbonic acids, until a mixture of monobasic lead salicylate and the lead salt of the other added acid is obtained.

LEONARD M. KEBRICH.